United States Patent [19]

Sobottka

[11] Patent Number: 5,366,645

[45] Date of Patent: Nov. 22, 1994

[54] ANTI-BLOCKING AGENT CONTAINING MODIFIED AMORPHOUS SILICA

[75] Inventor: Richard Sobottka, Worms, Germany

[73] Assignee: W. R. Grace & Co.-Conn., New York, N.Y.

[21] Appl. No.: 883,072

[22] Filed: May 15, 1992

[30] Foreign Application Priority Data

May 18, 1991 [DE] Germany ............... 4116396

[51] Int. Cl.$^5$ ................................. C08K 5/16
[52] U.S. Cl. ..................... 252/28; 106/491; 252/315.2; 423/338; 423/339
[58] Field of Search ............. 252/28, 315.2, 315.6; 106/491; 423/338, 339

[56] References Cited

U.S. PATENT DOCUMENTS

| | | | |
|---|---|---|---|
| 3,252,859 | 5/1966 | Silver et al. | 167/53.2 |
| 4,675,122 | 6/1987 | Lüers et al. | 252/28 |
| 4,844,980 | 7/1989 | Gruning et al. | 428/405 |
| 4,995,995 | 2/1991 | Garvey et al. | 252/28 |
| 5,128,067 | 7/1992 | Placek | 252/602 |
| 5,167,851 | 12/1992 | Janison et al. | 252/74 |

FOREIGN PATENT DOCUMENTS 01141928 2/1989 Japan .
01141929 2/1989 Japan .
02199147 7/1990 Japan .

OTHER PUBLICATIONS

Satish K. Wason, Pigment Handbook vol. 1: Properties and Economics 2d Ed., Peter Lewis (Ed.), John Wiley & Sons, Inc. (1988) pp. 175-181.

The Chemistry of Silica, Ralph K. Iler, John Wiley & Sons, New York (NY), 1979, p. 493.

*Primary Examiner*—Olik Chaudhuri
*Assistant Examiner*—Ken Horton
*Attorney, Agent, or Firm*—Steven Capella

[57] ABSTRACT

A modified amorphous silica is described which, apart from optionally present usual additives, comprises 40 to 85 wt-% silica and 60 to 15 wt-% paraffin, silicone or vegetable oil and/or ethylene glycol. The modified amorphous silica is prepared by bringing together, apart from optionally present usual additives, silica with such a quantity of paraffin, silicone or vegetable oil and/or ethylene glycol that the finished, modified silica has a paraffin, silicone or vegetable oil and/or ethylene glycol content of 60 to 15 wt-%. The modified amorphous silica is suitable as an anti-blocking agent, which can be advantageously prepared as concentrate (masterbatch). Surprisingly, upon preparing such a concentrate the melt-flow index hardly falls compared with the melt-flow index of the polyolefin which forms the basis of the concentrate. Thus it is possible to incorporate large quantities of the modified silica into the concentrate in very homogeneous distribution. This in turn has a favourable effect on the use of the concentrate for the manufacture of films.

14 Claims, 2 Drawing Sheets

ANTI-BLOCKING AGENT CONTAINING MODIFIED AMORPHOUS SILICA

FIELD OF THE INVENTION

The invention relates to a modified amorphous silica, to a process for its preparation and to an anti-blocking agent which consists of this silica or contains it.

BACKGROUND OF THE INVENTION

Amorphous, synthetic silica prepared according to the gel process and set to controlled particle sizes by grinding silica gel, has for a long time served as an effective anti-blocking agent for polyolefin films (polyethylene, polypropylene, ethylene copolymers). Such silicas are known, for example, by the trade name SYLOBLOC®. Despite the good efficacy and the acceptability with regard to health, these silicas display disadvantages during handling and incorporation. Thus, during handling unpleasant dust forms, which moreover leads to losses. The disadvantages upon incorporation can negatively influence the film quality.

Precipitated silica, wet-chemically prepared (e.g. from acid and alkali silicate solution) is also used as an anti-blocking agent. Such types of silica likewise display the afore-mentioned handling and incorporation disadvantages.

In most cases, silica is incorporated using screw or internal kneaders. Here, use is often made of the masterbatch technique, i.e. 5, 10, or 20 wt-% silica is incorporated into the plastics material. Because of the structure of silica, the melt viscosity of the plastics material rises drastically depending on the quantity of silica. This is also shown upon comparing the MFI (melt-flow index) of plastics material without silica and plastics material with silica. Plastics material with silica displays a considerably lower MFI.

However, the increase in the melt viscosity upon processing/incorporating silica leads to increased pressures in the extruder and to a reduction in output. Furthermore, because of the increase in the melt viscosity, under optimum production conditions only approximately 20 to 25 wt-% silica can be incorporated into the plastics material. Larger quantities, for example up to approximately 30 wt-%, are admittedly possible under certain circumstances, but then a reduced output with unsatisfactory distribution of the silica particles and with a further lowering of the melt-flow index must be expected. Too low a melt-flow index of the masterbatch (plastics material with silica) means that the latter is not properly distributed upon processing with film plastics. Thus, inhomogeneities occur in the film (flow lines, gels, silica agglomerates). This is, for example, the case if a masterbatch (plastics material with 20 wt-% silica) with a MFI of 1.0 is incorporated into a high-pressure polyethylene film raw material with a MFI of 2, because this masterbatch is not homogeneously distributed in the film raw material.

The afore-mentioned disadvantages during handling involve the major dust formation of the silicas which are processed with bulk densities of approximately 80 to 250 g/l. The dust which occurs when opening bags or when pouring silica into hoppers, mixers or containers is not only extremely unpleasant for the personnel, but also means a loss of silica for the user.

OBJECTS OF THE INVENTION

Therefore it is an object of the invention to provide a modified amorphous silica which avoids the above explained disadvantages of amorphous silicas previously used as anti-blocking agents (ground silica gels or precipitated silica).

It is a further object of the invention to provide a modified amorphous silica with improved incorparability into polyolefins so that highly concentrated master batches (silica plus plastics material) can be prepared without an undue increase in the melt viscosity.

It is also an object of the invention to provide a modified amorphous silica which results in an improved flow behaviour of a master batch comprising polyolefin and modified silica and thus leads to a reduction of inhomogeneities in films into which said master batch is incorporated.

It is an additional object of the invention to provide a modified amorphous silica which when incorporated into polyolefins does not lead to a decrease of the melt-flow index of the resulting master batch if its concentration is increased.

It is another object of the invention to provide a modified amorphous silica in form of a free-flowing powder which eliminates or at least reduces the formation of dust upon handling usually experienced with conventional silica.

Finally it is an object of the invention to provide an anti-blocking agent comprising a modified amorphous silica with an anti-blocking efficiency which is as good as or slightly better than that of conventional anti-blocking agents comprising conventional silica.

SUMMARY OF THE INVENTION

The invention is directed to a modified amorphous silica in form of a free-flowing powder based on porous silica prepared according to the gel process or by precipitation and having a BET surface of 100 to 650 m$^2$/g and a pore volume of 0.8 to 2 cm$^3$/g, which, apart from optionally present usual additives, consists of 40 to 85 wt-% silica and 60 to 15 wt-% paraffin, silicone or vegetable oil and/or ethylene glycol with the proviso that the ethylene glycol content is more than 25wt-% if no paraffin, silicone and/or vegetable oil is present as modifying agent.

A further subject of the invention is a process for preparing such modified amorphous silica which is characterized in that, apart from optionally present usual additives, amorphous porous silica is brought together with such a quantity of paraffin, silicone or vegetable oil and/or ethylene glycol that the finished, amorphous modified silica has a paraffin, silicone or vegetable oil and/or ethylene glycol content of 60 to 15 wt-%, the ethylene glycol content in the absence of paraffin, silicone and/or vegetable oil being greater than 25 wt-%.

Another object of the invention is an antiblocking agent which comprises a silica modified according to the invention.

Preferred embodiments and advantages of the invention will become apparent from the following detailed description of the invention and the claims.

DETAILED DESCRIPTION OF THE INVENTION

Figure 1:
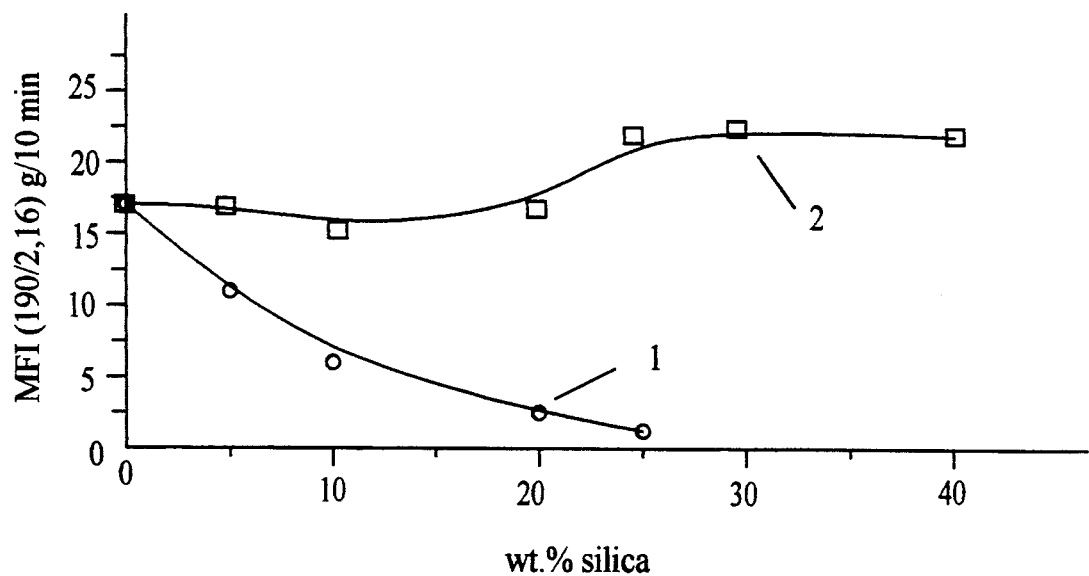
FIGS. 1 and 2 illustrate the advantages of the present invention treating process over untreated silica.

It was surprisingly found that the afore-mentioned disadvantages of the prior art can be considerably or even completely eliminated by the modification according to the invention of the silica, without the modification limiting the use of the silica, reducing its anti-blocking effectiveness or undesirably changing the film properties such as haze, tensile strength and e.g. slip behaviour.

The product according to the invention can therefore be used as an anti-blocking agent in polyolefin films (polyethylene, polypropylene) and in films made from polyolefin copolymers (e.g. EVA). Incorporation can take place by means of usual machines such as internal kneaders or screw kneaders into pellets and also powder. The product according to the invention can be processed in high concentrations (e.g. 40 wt-% polymer plus 60 wt-% product according to the invention, by means of internal mixer) with the polymer to give master-batches. In order to obtain a sufficient anti-blocking effect, the final concentration of the product according to the invention in polyolefin films is to be 500 to 8000 ppm, preferably 1000 to 4000 ppm. The application possibilities of the product according to the invention, when compared with pure silica, are simplified or improved. Thus, the dust-free product according to the invention can be added to the polymer without any loss e.g. via open metered-feed apparatus (weigh belts).

The silica used according to the invention is a porous, amorphous silica which is prepared according to the gel process with subsequent grinding of the obtained silica gel. This porous, amorphous silica has a high inner surface, high porosity and particle sizes in the micrometer range. In general the surface according to BET is in the range of 100 to 650 $m^2/g$ and the pore volume is in the range of 0.8 to 2 $cm^3/g$. Because of their "sponge structure", the silica particles can bind or adsorb liquids such as the modifiers—paraffin, silicone or vegetable oil and/or ethylene glycol—used according to the invention.

In the same way wet-chemically prepared precipitated silica, which likewise displays a high inner surface, high porosity and particles sizes in the micrometer range, can also be used according to the invention.

With the modification according to the invention a dust-free end-product is obtained which greatly facilitates incorporation into polyolefins and improves processing with polyolefins and their copolymers to form master-batches. Improvement is further shown in that the melt-flow index of a masterbatch highly-filled with silica is generally at least half as great as the melt-flow index of the polyolefin and in most cases does not decrease, but actually rises somewhat. Thus, the high concentration of silica (10 to 45 wt-%, see below) is first possible in the polymer. A further improvement is that, upon using the silica according to the invention as an anti-blocking agent in films, the distribution of the silica particles becomes even more homogeneous and the number of flecks, gels etc. in the film is reduced.

The silica modified according to the invention displays bulk densities of 100 to approximately 600 g/l and is a free-flowing, dry powder. It is suitable as an anti-blocking agent with average particle sizes of 1 to 20 μm.

Apart from optionally present usual additives, the silica modified according to the invention comprises 40 to 85 wt-% silica and 60 to 15 wt-% modifier. In order that the silica modified according to the invention is dust-free, it is preferred if the proportion of silica is 40 to 65 wt-% and the proportion of modifier is 60 to 35 wt-%.

The preferred modifier is paraffin oil. This involves in particular liquid, transparent, odour-free oils which meet the purity requirements of the DAB. Such oils have a viscosity of 20 to 80 mPa s at 40° C. and a density of 0.8 to 0.9 $g/cm^3$ at 20° C.

In addition, silicone oil, vegetable oil and ethylene glycol can be used as modifier. These modifiers are equivalent to paraffin oil in terms of freedom from dust, but with regard to distribution of the silica particles and temperature stability, do not have such a marked effect as paraffin oil.

As silicone oil, colourless, odourless organopolysiloxane such as e.g. methylphenyl polysiloxane with a density of 1.04 to 1.1 $g/m^3$ at 25° C. and a viscosity of 180 to 220 mPa s at 25° C. is preferably used.

As vegetable oil, the standard commercial oils such as castor oil, soybean oil, sunflower oil, olive oil, rape-seed oil and mixtures thereof can be used.

As mentioned above, the silica modified according to the invention can optionally contain usual additives. These include organic or inorganic substances, which have a pH-regulating effect or promote incorporation into, and slip effect against, films. These additives are generally applied to the silica in quantities up to 5 wt-%.

The silica and modifier can be brought together in conventional powder mixers. The modifier is slowly added to the silica by being dropped or sprayed in. This should be done at low mixer speeds. This results in a pourable, dust-free powder.

However, the modifier can also be added to the silica during preparation of the silica. When the silica is prepared continuously, the modifier can be added dosewise to the silica in the corresponding ratio. The modifier is correspondingly distributed through subsequent homogenization or mixing steps.

The silica, charged in the described manner with modifier, can then be passed at once to the filling and bagging station.

The silica modified according to the invention, when compared with corresponding silicas of the prior art, displays the following advantages:

1. virtually complete freedom from dust during application, so that dust-protection measures are as good as superfluous, there are no losses of silica and the general handling such as metered feeding, mixing, filling etc. is greatly simplified, the latter also because, through the modification, the bulk density of the product is greatly increased and in many cases is practically tripled;
2. no increase in melt viscosity during incorporation into polyolefins, i.e. overall improved processibility without lowering of the throughput rates, achievement of 40 wt-%, and under certain circumstances 45 wt-%, silica in polyolefins during preparation of the masterbatch (concentrate), and thus improved profitability;
3. no lowering of the melt-flow index of polyolefins after incorporation during preparation of the masterbatch, i.e. it is not absolutely necessary for preparation of the masterbatch to choose a polymer with a particularly high melt-flow index, and the masterbatch is distributed more homogeneously in the film raw material and gives rise to less flow inhomogeneities, flecks, gels and agglomerates, so that the quality of the film improves;
4. with a pre-given polymer of known melt-flow index, by using a certain modified silica the desired melt-flow index of a masterbatch to be prepared can be determined or chosen even before batching, which in many cases signifies an improvement in the process;
5. slightly improved anti-blocking effect.

The afore-mentioned setting or selecting of the melt-flow index of master-batches comprising silica modified according to the invention and polyolefin can take place, say, in the following way, because the melt-flow index of the starting polymer is known:

MFI of the starting polyethylene e.g. 3 g/10 min (190/2.16)

| Aim MFI of masterbatch with | | Setting the desired MFI by using the modified silica with wt % silica:paraffin oil |
|---|---|---|
| 15 wt % silica is to be | 30 | |
| | 1-2 | 70:30 |
| | 2-3 | 65:35 |
| | 5-6 | 55:45 |
| ca. 1 | | 85:15 |
| 1-2 | | 70:30 |
| 3-4 | | 55:45 |

Practice of the invention will become further apparent from the following non-limiting examples.

EXAMPLE 1

A specific amount of silica (SYLOBLOC 45) was introduced into a powder mixer (Henschel type). The silica had a pore volume of 1.2 cm$^3$/g, an average particle size of 4$\mu$m, a BET surface of 500 m$^2$/g, an oil adsorption of 200 g/100 g and a bulk density of approximately 180 g/l. At low mixer speeds a paraffin oil from Merck, namely thinly-liquid paraffin DAB, CAS-No.: 8012-95-1, density at 20° C. approximately 0.88 g/cm$^3$, viscosity at 20° C. <70 mPa s, was added drop-wise or by spraying with a spray bottle. After the addition of 10, 20, 30, 40 and 50 wt-% paraffin oil, in each case samples were taken from the mixer. The results obtained are given in the following table.

TABLE

| Sample No. | Parts Silica | Paraffin oil | Behaviour of the samples |
|---|---|---|---|
| 1 | 90 | 10 | very dusty, dry powder |
| 2 | 80 | 20 | dusty, dry powder |
| 3 | 70 | 30 | less dusty, dry powder |
| 4 | 60 | 40 | less dusty, powder, very small crumbs |
| 5 | 50 | 50 | non-dusty, powder and small crumbs |

EXAMPLE 2

The test procedure of Example 1 was repeated, 55 wt-% silica and 45 wt-% paraffin oil being used. The product obtained gave freedom from dust upon handling and improved incorporability in polyolefins, i.e. no lowering of the melt-flow index with master-batches containing high proportions of silica, optimum homogeneous distribution of the silica particles in films and thus an improved anti-blocking effect and reduction in inhomogeneities in films. The use of less than 45 wt-% paraffin oil likewise resulted, compared with pure silica, in improved incorporability in polyolefins. However, freedom from dust no longer obtained.

EXAMPLE 3

Corresponding studies as per Examples 1 and 2 were carried out on two other silicas. The first silica (SYLOBLOC 47) had a pore volume of 1.2 cm$^3$/g, an average particle size of 5 $\mu$m, a BET surface of 400 m$^2$/g, an oil adsorption of 200 g/100 g and a bulk density of approximately 180 g/l. The second silica (SYLOBLOC 44) had a pore volume of 1.6 cm$^3$/g, an average particle size of 2 $\mu$m, a BET surface of 400 m$^2$/g, an oil adsorption of 300 g/100 g and a bulk density of approximately 100 g/l . Mixtures of the first silica with 40 wt-% paraffin oil and of the second silica with 50 to 55 wt-% paraffin oil were as good as dust-free. The technical-application studies of these products resulted in the same advantages as quoted in Example 2.

EXAMPLE 4

Example 1 was repeated, paraffin oil being replaced by castor oil, silicone oil (Wacker AP 200, organopolysiloxane corresponding to the above data in the description), ethylene glycol and soybean oil. Upon addition of 85 to 90 parts by weight of these modifiers per 100 parts by weight silica, dust-free anti-blocking agents were obtained. The technical-application studies showed that these mixtures likewise displayed advantages compared with pure, unmodified silica. However, these advantages were not as pronounced as when paraffin oil was used. Thus, the silicas provided with these modifiers were not incorporated into polyethylene in such high concentrations as those provided with paraffin oil (see Table). Probably because of the lower temperature stability of soybean oil, master-batches comprising polyethylene and silica modified with soybean oil showed colour changes.

With regard to the silica concentrations achievable in the masterbatch (in polyethylenes) and with regard to the MFI (melt-flow index) compared with the starting polyethylene, the results obtained can be summarized as follows:

| Silica with | Achievable conc.* in polyethylene** wt % | MFI 190/2.16 of the concentrate g/10 min |
|---|---|---|
| without | 20-25 | approx. 0.3 |
| paraffin oil | 40-45 | approx. 7.0 |
| castor oil | 30-35 | approx. 1.8 |
| silicone oil | 30-35 | approx. 0.8 |
| ethylene glycol | 30-35 | approx. 0.8 |
| soybean oil | 30-35 | approx. 3.2 |

*Calculated as pure, unmodified silica
**Lupolen 3020 K, high-pressure polyethylene, MFI 190/2.16 = 3.2 g/10 min

EXAMPLE 5

The silica used in Example 1 was treated with the aforementioned paraffin oil until reaching complete freedom from dust was achieved. Once again treatment took place by spraying the silica, with simultaneous mixing in a powder mixer. The prepared product finally comprised 55 wt-% silica and 45 wt-% paraffin oil. It was incorporated in a quantity of 10 wt-% into high-pressure polyethylene powder (masterbatch X) under the following conditions.

| | |
|---|---|
| Mixer: | powder mixer (Papenmeier) |
| Extruder: | Leistritz LSM 34 GL |
| Processing temperature: | 160–170° C. |
| Mass temperature: | 171° C. |
| Deaeration: | none |
| Strainers: | none |
| Output: | 11.1 kg/h |
| Polyethylene: | LD-PE 22, Stamylan 1722 P 500 |
| Pellet form/shape: | cylinder |

With this test the following advantages emerged, compared with the conventional unmodified silica:
  upon mixing no development of dust, no de-mixing, no bridging, problem-free dosing
  constant output under constant extrusion conditions
  190/2.16 melt-flow index of the finished concentrate 25.2 g/10 min (melt-flow index of the basic material ca. 22 g/10 min).

The thus prepared masterbatch was used for manufacturing films. For this the masterbatch was mixed with Lupolen 2420 H (high-pressure polyethylene from BASF AG) so that the finished mixtures contained 0.1 or 0.2 wt-% modified silica. The film was manufactured on an extruder with a blow die under the following conditions:

| | |
|---|---|
| Extruder: | Kiefel Rotex 25 |
| Screw diameter: | 25 mm |
| Die diameter: | 50 mm |
| Strainers: | coarse |
| Output: | 10 kg/h |
| Film thickness: | 40 μm |
| Laying width: | 180 mm |

For comparison purposes, films were manufactured into which pure, unmodified silica in the form of a 10% concentrate (masterbatch Y) was incorporated. The end-concentration of silica in the film was 0.1 or 0.2 wt-%.

To determine the blocking behaviour, samples of film were artificially blocked under the following conditions:

| | A | B |
|---|---|---|
| Temperature, °C. | 70 | 60 |
| Load, N/cm$^2$ | 1 | 0.3 |
| Time, min | 60 | 180 |

Subsequently the force needed to separate two blocked sample films from each other, was measured (testing equipment: Davenport, 2-plate method). The results are given in the following table:

| Type of film | blocking conditions | Blocking forces [N]* A | B |
|---|---|---|---|
| without additive | | >1 | >1 |
| with 0.1 wt % product according to the invention Δ 0.055 wt % pure silica | | 0.76 | 0.49 |
| with 0.2 wt % product according to the invention Δ 0.11 wt % pure silica | | 0.34 | 0.20 |
| with 0.1 wt % pure silica | | 0.82 | 0.48 |
| with 0.2 wt % pure silica | | 0.37 | 0.22 |

*Average values from 6 individual measurements

The results show that the film with the anti-blocking agent according to the invention displays practically the same blocking values as the film with pure, unmodified silica. In some cases, the blocking forces at the films with the anti-blocking agent according to the invention are even somewhat lower.

On 5 film pieces (blown film laid out flat), approximately 50 cm long and 18 cm wide, the optically visible flecks/gels etc. were counted. Another film was also appraised, in which a highly-concentrated masterbatch comprising polyethylene/product according to the invention (masterbatch Z) was used. This masterbatch was prepared by introducing 660 g polyethylene into an internal mixer, adding 800 g of silica modified according to the invention (45 wt-% paraffin oil), mixing for 5 minutes and subsequently pelletizing. Because of the chosen quantity ratios, the silica proportion was 440 g or 40 wt-% relative to polymer plus silica (1100 g).

This highly-concentrated masterbatch was mixed with the film raw material Lupolen 2420 H so that the end-concentration of pure, unmodified silica was 0.1 wt-%. The film was subsequently prepared as described above.

The results obtained (number of optically visible flecks, gels etc.) are given in the following table, the size of the inhomogeneities taken into account being approximately >200 μm.

| Sample* No. | Film without additive | Film with addition of product of the invention/pure silica[2] | | | | |
|---|---|---|---|---|---|---|
| | | wt % 0.055[1] | pure 0.11[1] | silica 0.1[3] | wt % 0.1 | silica 0.2 |
| 1 | 3 | 14 | 13 | 14 | 20 | 18 |
| 2 | 3 | 9 | 14 | 19 | 15 | 32 |
| 3 | 2 | 11 | 16 | 11 | 18 | 28 |
| 4 | 4 | 8 | 15 | 8 | 21 | 23 |
| 5 | 2 | 10 | 12 | 16 | 16 | 21 |
| Total | 14 | 52 | 70 | 68 | 90 | 122 |

[1]masterbatch X
[2]masterbatch Y
[3]masterbatch Z
*Ca. 100 linear meters film were manufactured.

The individual samples were taken from the film as follows:
  Sample 1, then ca. 5 m without consideration
  Sample 2, then ca. 5 m without consideration, etc.

As the above results show, the "fleck-level" in the case of the films with the anti-blocking agent according to the invention is lower than with the films with unmodified silica. Even the film provided with the highly-concentrated masterbatch comprising polyethylene/anti-blocking agent according to the invention showed fewer flecks than the films which were provided with a masterbatch containing 10% unmodified silica.

EXAMPLE 6

As per Example 1, a modified silica was prepared which contained 45 wt-% paraffin oil. This was incorporated into two types of high-pressure polyethylene by means of a Werner und Pfleiderer type internal kneader, namely into
  a) Lupolen 1800 S (BASF AG, MFI 1.90/2.16=17 g/10 min) and
  b) Lupolen 3020 K (BASF AG, MFI 1.90/2.16=3 g/10 min).

The incorporated quantities of modified silica were so chosen that the end-concentration (target concentration) of pure unmodified silica was 5, 10, 20, 25, 30 and 40 wt-%.

In a further test the same silica was incorporated into the named polymers in a pure, i.e. unmodified state. The quantities of silica used were 5, 10, 10, 25, 30 and 40 wt-%.

Corresponding tests were also carried out with precipitated silica. The precipitated silica used is known by the trade name silica FK 310 (Degussa). Typical characteristic values given by the manufacturer are the average particle size of 2 to 3 μm, BET surface of 650 m²/g, $SiO_2$ content of 99%, tamped density of 110 g/l and drying loss (2 h, 105° C.) of 2.5%. This precipitated silica was, as described in Example 1, treated with paraffin oil, so that the resulting dust-free product likewise contained 45 wt-% paraffin oil. The thus modified precipitated silica was incorporated into the polyethylene named above under b) in quantities of 10, 20 and 30 wt-% (calculated as pure silica).

In a further test the same precipitated silica was incorporated pure, i.e. unmodified into the polyethylene named above under b). The quantities used were 10, 20 and 25 wt-%.

With this method of incorporation, firstly a defined amount of polymer was placed in the kneader and melted by temperature and shearing. The silica was subsequently added. After a further 5minute kneading (mixing) of polymer and silica, the concentrate was removed from the mixer. It was observed that upon addition the non-modified silicas gave off a considerable amount of dust (loss of silica), with 30 wt-% or more of the unmodified silicas not being incorporable under the pre-set conditions (the melted polymer did not mix with this large amount of silica) and the products according to the invention could be added problem-free, without the formation of dust, to the melted polymer in a quantity, calculated as silica, of up to 40 wt-%.

The thus prepared master-batches were investigated with regard to $SiO_2$ content and melt-flow index. It emerged that, in the case of the master-batches with non-modified silica, in each case larger deviations of actual concentration from target concentration were noted than with the concentrates with the products according to the invention. With a target concentration of, for example, 20 wt-%, a concentration of 17.9 wt-% was ascertained for the masterbatch containing non-modified silica (SYLOBLOC® 45) and a concentration of 19.1 wt-% for the masterbatch containing silica modified according to the invention (deviations up to approximately 1 wt-% are explainable through moisture loss, larger deviations may signify losses through dust).

Figure 2:
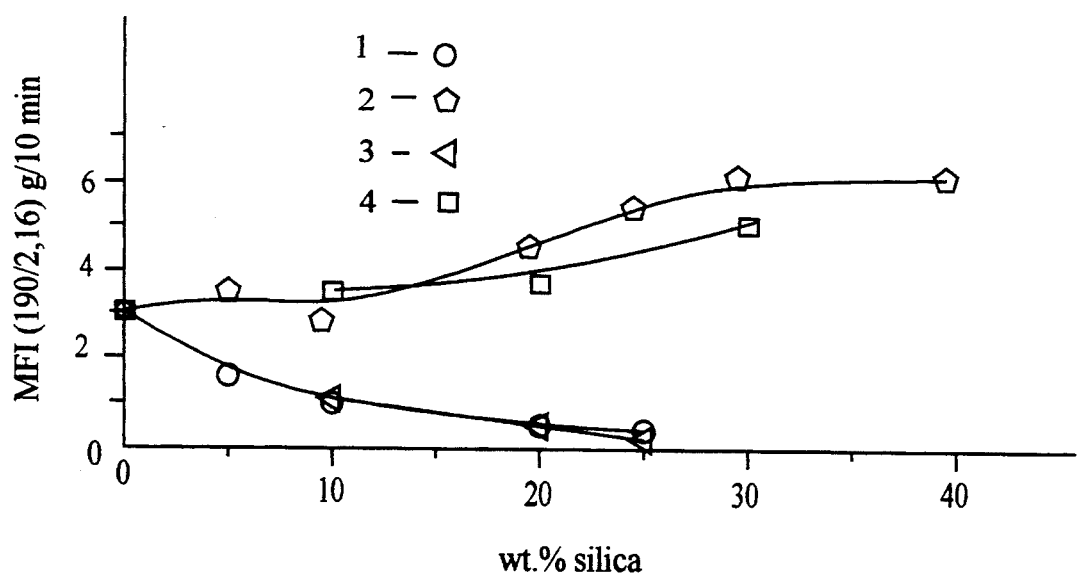

The melt-flow indices (190/2.16) measured for the various master-batches are shown in the form of graphs in FIGS. 1 and 2. It is to be noted that, when increasing quantities of non-modified silica are used, the melt-flow index is drastically lowered. The result of this was then, amongst other things, that quantities of more than 25 wt-% were practically no longer incorporable. However, it is also to be noted that when using the products according to the invention, the melt-flow index actually increases with larger addition amounts. Thus, the incorporation of larger quantities is only then possible.

EXAMPLE 7

A silica (SYLOBLOC 47, average particle size 5 μm, BET surface 400 m2/g) was modified as described in Example 1. A dust-free product comprising 60 wt-% silica and 40 wt-% paraffin oil was finally obtained. This product was incorporated into Lupolen 3020 K high-pressure polyethylene, as described in Example 2. The quantity of modified silica incorporated was 18 wt-%, i.e. the pure silica content was 10.8 wt-%. In a corresponding fashion non-modified silica (SYLOBLOC 47) was incorporated into the same polymer at the rate of 10 wt-%. Whilst the polymer without additive displayed a melt-flow index (190/2.16) of 3.2 g/10 min, the concentrate with pure silica had a melt-flow index of 1.6 g/10 min and the concentrate with 18 wt-% silica modified according to the invention a melt-flow index of 4.2 g/10 min.

For the purposes of manufacturing blown film, Lupolen 2420 H high-pressure polyethylene was mixed with the finished master-batches so as to provide silica end-concentrations of 0.2 and 0.3 wt-% in the mixtures. Blown films 40 μm thick were extruded from these mixtures. The following measurements and observations were made on the obtained blown films.

With regard to mechanical properties (tensile strength, elongation), the films with the silica modified according to the invention do not differ from the films with the pure silica. However, the latter exhibit more flecks/gels than the films with the silica modified according to the invention. To ascertain the blocking behaviour, film samples were artificially blocked under the following conditions:

|  | A | B |
| --- | --- | --- |
| Temperature, °C. | 70 | 60 |
| Load, N/cm² | 1 | 0.3 |
| Time, min | 60 | 180 |

Subsequently, the force needed to separate two blocked film samples from each other was measured. This was done with the Davenport blocking-test equipment (2plate method).

| blocking conditions | Blocking forces [N] | |
| --- | --- | --- |
|  | A | B |
| Film with 0.33 wt % product according to the invention[1] | 0.30 | 0.04 |
| Film with 0.5 wt % product according to the invention[2] | 0.17 | 0.00 |
| Film with 0.2 wt % silica | 0.70 | 0.20 |
| Film with 0.3 wt % silica | 0.22 | 0.00 |
| Film without silica | >1 | 1.00 |

[1]corresponds to 0.2 wt % silica
[2]corresponds to 0.3 wt % silica

The results obtained show that when using the product according to the invention, the anti-blocking behaviour of films was improved. This improvement, compared with normal silica, is due to a more homogeneous distribution of the individual particles in the film.

EXAMPLE 8

A silica (SYLOBLOC 45) was charged, as described in Example 1, a) with 15 wt-% and b) with 30 wt-% paraffin oil. During processing the products thus prepared exhibited dust-formation, which, however, was less with the product containing 30 wt-% paraffin oil.

Both products were incorporated into Lupolen 3020 K high-pressure polyethylene (MFI 190/2.16=3.2) by means of an internal kneader. The quantities incorporated were in each case chosen so that the proportion of pure silica was 15 and 30 wt-% respectively. The 190/2.16 melt-flow index of the prepared concentrates was determined. The results are shown in the following table.

| Concentration wt % silica | Melt-flow index of masterbatch | | |
|---|---|---|---|
| | product according to the invention | Silica:Paraffin oil | |
| | | 85:15 | 70:30 |
| ca. 30 | 36 | 0.4 | |
| ca. 15 | 18 | 0.9 | |
| ca. 30 | 42 | | 1.5 |
| ca. 15 | 21 | | 1.6 |

Comparison:
MFI 190/2.16
  using 15 wt-% pure silica: 0.5 g/10 min
  using 25 wt-% pure silica: 0.3 g/10 min
  using 30 wt-% pure silica: n.a.

As the above results show, master-batches with 30 wt-% silica were preparable using the silica modified according to the invention. When using the product with 15 wt-% paraffin oil, however, the melt-flow index fell significantly after incorporation into the polymer (especially in the case of 30 wt-% addition calculated as silica).

The product with 30 wt-% paraffin oil, however, still endows the prepared master-batches with good processibility or a melt-flow index greater than 1 even at concentrations of 30 wt-%, calculated as silica.

This example therefore shows that, in cases where absolute freedom from dust is not necessary, products according to the invention with 70 wt-% silica and 30 wt-% paraffin oil also result in improved processibility or that master-batches can be provided with 30 wt-%, and more, silica.

EXAMPLE 9

Modified silicas were prepared by treating 55 parts by weight silica (SYLOBLOC 45) with 45 parts by weight castor oil, silicone oil (see Example 4) or ethylene glycol, in the way described in Example 1. The obtained products were practically dust-free. 15 and 30 wt-% (calculated as silica) of these products according to the invention were incorporated into Lupolen 3020 K high-pressure polyethylene, as described in Example 2. The following melt-flow indices (190/2.16 ) of the master-batches were ascertained:

| Master batch with | Melt-flow index (g/10 min) Silica wt % | |
|---|---|---|
| | 15 | 30 |
| pure silica | 0.8 | n.a. |
| silica/paraffin oil | 4.0 | 6.2 |
| silica/castor oil | 2.3 | 1.9 |
| silica/silicone oil | 1.6 | 0.8 |
| silica/ethylene glycol | 1.7 | 0.8 |

As the results show, modification of the silica with castor oil, silicone oil or ethylene glycol also permits concentrations of 30 wt-% silica in the polymer to be obtained, which was scarcely possible with pure silica. However, unlike what happens with the modification with paraffin oil, the melt-flow index of the masterbatches falls as the silica content increases. This fall in the melt-flow index is nevertheless not as drastic as that occurring when pure silica is used, so that castor oil, silicone oil and ethylene glycol are also suitable for the modification according to the invention of silica.

The prepared masterbatches were mixed with high-pressure polyethylene (Lupolen 2420 H, BASF AG) so that end-concentrations of 0.2 and 0.3 wt-% pure silica were obtained. Thin flat films (approximately 30 μm thick) were extruded from these mixtures. Visual appraisal of the films showed that, with regard to freedom from flecks, a product according to the invention with silicone oil is to be preferred to the products according to the invention with castor oil or ethylene glycol.

I claim:

1. An anti-blocking agent comprising (a) porous amorphous silica particles having a BET surface area of 100–650 m$^2$/g and pore volume of 0.8–2 cm$^3$/g, and (b) a liquid selected from the group consisting of paraffin oil, silicone oil, vegetable oil, ethylene glycol and mixtures thereof, wherein said agent contains 15–60 wt. % of said liquid based on the combined weight of said silica and said liquid and wherein when said liquid consists of ethylene glycol, said agent contains 25–60 wt. % ethylene glycol based on said combined weight.

2. The anti-blocking agent of claim 1 wherein said agent contains 35–60 wt. % of said liquid based on said combined weight.

3. The anti-blocking agent of claim 1 wherein said liquid is paraffin oil.

4. The anti-blocking agent of claim 1 wherein said liquid is a vegetable oil selected from the group consisting of castor oil, soybean oil and mixtures thereof.

5. The anti-blocking agent of claim 3 wherein said agent contains 40–55 wt. % paraffin oil based on said combined weight.

6. The anti-blocking agent of claim 1 wherein said agent is a free flowing powder.

7. The anti-blocking agent of claim 6 wherein said agent has a bulk density of 100–600 g/l.

8. The anti-blocking agent of claim 1 wherein said agent further comprises (c) polyolefin.

9. The anti-blocking agent of claim 8 wherein said agent contains 10–45 wt. % said amorphous silica based on the combined weight of said silica and said polyolefin.

10. The anti-blocking agent of claim 9 wherein said agent has a melt-flow index equal to at least half the melt-flow index of said polyolefin.

11. The anti-blocking agent of claim 10 wherein the-melt-flow index of said agent is greater than or equal to the melt flow index of said polyolefin.

12. The anti-blocking agent of claim 1 wherein said agent consists essentially of said silica and said liquid.

13. The anti-blocking agent of claim 12 wherein said agent consists of said silica and said liquid.

14. The anti-blocking agent of claim 6 wherein said liquid is bound and/or absorbed by said silica.

* * * * *